US009898043B2

(12) United States Patent
Agata et al.

(10) Patent No.: US 9,898,043 B2
(45) Date of Patent: Feb. 20, 2018

(54) EXPANSION UNIT FOR PORTABLE INFORMATION EQUIPMENT

(71) Applicant: LENOVO (SINGAPORE) PTE. LTD., Singapore (SG)

(72) Inventors: Hiroaki Agata, Kanagawa-ken (JP); Kazuo Nakada, Kanagawa-ken (JP); Eiji Shinohara, Kanagawa-ken (JP); Hideaki Hasegawa, Tokyo-to (JP)

(73) Assignee: Lenovo (Singapore) PTE LTD (SG)

( * ) Notice: Subject to any disclaimer, the term of this patent is extended or adjusted under 35 U.S.C. 154(b) by 0 days.

(21) Appl. No.: 15/386,980

(22) Filed: Dec. 21, 2016

(65) Prior Publication Data
US 2017/0177030 A1  Jun. 22, 2017

(30) Foreign Application Priority Data
Dec. 21, 2015  (JP) .................................. 2015-248365

(51) Int. Cl.
*G06F 1/16* (2006.01)
(52) U.S. Cl.
CPC .................. *G06F 1/1632* (2013.01)
(58) Field of Classification Search
CPC .................................................... G06F 1/1632
See application file for complete search history.

(56) References Cited

U.S. PATENT DOCUMENTS

| 4,958,889 | A | * | 9/1990 | Boyle | G06F 1/1632 |
|---|---|---|---|---|---|
| | | | | | 248/188.6 |
| 4,969,830 | A | * | 11/1990 | Daly | G06F 1/1632 |
| | | | | | 200/50.1 |
| 4,978,949 | A | * | 12/1990 | Herron | G06F 1/1616 |
| | | | | | 345/168 |
| 4,986,763 | A | * | 1/1991 | Boyle | G06F 1/1616 |
| | | | | | 361/679.26 |
| 5,019,465 | A | * | 5/1991 | Herron | G06F 1/1616 |
| | | | | | 365/229 |
| 5,030,128 | A | * | 7/1991 | Herron | G06F 1/1632 |
| | | | | | 361/679.43 |

(Continued)

FOREIGN PATENT DOCUMENTS

JP  2000-267762 A  9/2000
JP  2008-176799 A  7/2008
(Continued)

*Primary Examiner* — Lisa Lea Edmonds
(74) *Attorney, Agent, or Firm* — Russell Ng PLLC; Anthony P. Ng

(57) ABSTRACT

An electronic device having a portable information equipment and an expansion unit is disclosed. The portable information equipment can be a tablet PC and the expansion unit is configured to expand a function of the tablet PC. The expansion unit includes an attachment part having a hook configured to be movable in an engagement direction from a non-engagement position to an engagement position, in the non-engagement position. The hook can be inserted into an engagement hole disposed at an attached part of the tablet PC in the engagement position. The hook can be further movable in a pulling direction of pulling the tablet PC towards the expansion unit 14, with the pulling direction being orthogonal to the engagement direction. A lever is utilized to move the hook in the engagement direction and in the pulling direction.

8 Claims, 16 Drawing Sheets

(56) References Cited

U.S. PATENT DOCUMENTS

| | | | | |
|---|---|---|---|---|
| 5,196,993 | A * | 3/1993 | Herron | F16M 11/10 248/923 |
| 5,310,358 | A * | 5/1994 | Johnson | G06F 1/1632 361/679.41 |
| 5,737,541 | A * | 4/1998 | Shimizu | G06F 1/1632 361/679.41 |
| 5,790,375 | A * | 8/1998 | Lee | G06F 1/1632 361/679.43 |
| 6,015,308 | A * | 1/2000 | Lee | G06F 1/1632 361/679.41 |
| 6,189,349 | B1 * | 2/2001 | Helot | E05B 73/0082 70/57 |
| 6,216,195 | B1 * | 4/2001 | Lee | G06F 1/1632 361/679.41 |
| 7,599,178 | B2 * | 10/2009 | Huang | G06F 1/1626 361/679.28 |
| 8,172,282 | B2 * | 5/2012 | Lev | E05B 65/006 292/110 |
| 9,326,397 | B2 * | 4/2016 | Yamazaki | H05K 5/0208 |
| 9,690,332 | B2 * | 6/2017 | Liu | G06F 1/1681 |
| 2002/0131234 | A1 * | 9/2002 | Sterner | G06F 1/1632 361/679.41 |
| 2005/0146849 | A1 * | 7/2005 | Mullen | E05B 73/0082 361/679.57 |
| 2006/0139875 | A1 * | 6/2006 | Cheng | G06F 1/1632 361/679.57 |
| 2007/0070598 | A1 * | 3/2007 | Chuang | G06F 1/1632 361/679.43 |
| 2010/0265652 | A1 * | 10/2010 | Agata | G06F 1/1632 361/679.41 |
| 2012/0063081 | A1 * | 3/2012 | Grunwald | B60R 11/0235 361/679.41 |
| 2013/0155583 | A1 * | 6/2013 | Yang | G06F 1/1626 361/679.01 |
| 2014/0285963 | A1 * | 9/2014 | Vasilevsky | G06F 1/1632 361/679.43 |
| 2016/0209872 | A1 * | 7/2016 | Vasilevsky | G06F 1/1632 |

FOREIGN PATENT DOCUMENTS

| | | |
|---|---|---|
| JP | 2010250699 A | 11/2010 |
| JP | 2014-229201 A | 12/2014 |
| WO | 2011070684 A1 | 6/2011 |
| WO | 2015151723 A1 | 10/2015 |

* cited by examiner

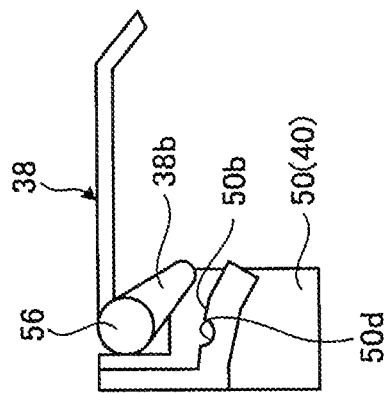
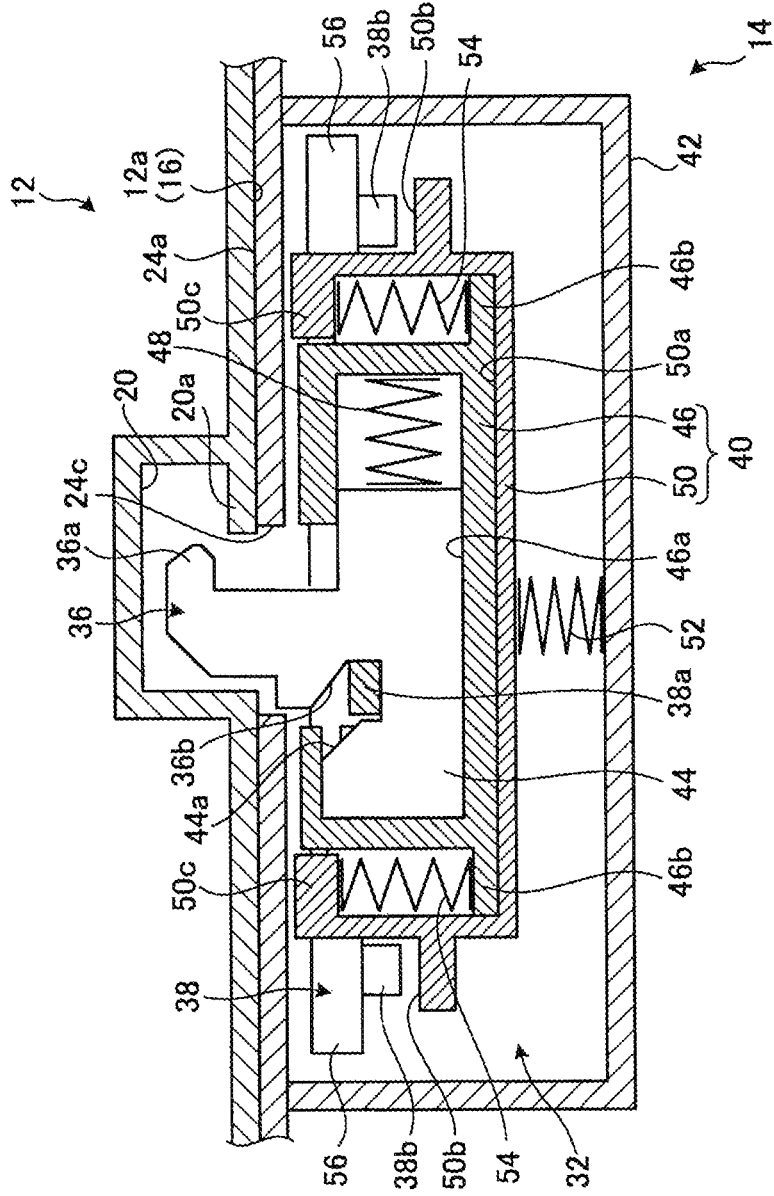
FIG. 6B
FIG. 6A

EXPANSION UNIT FOR PORTABLE INFORMATION EQUIPMENT

PRIORITY CLAIM

The present application claims benefit of priority under 35 U.S.C. §§ 120, 365 to the previously filed Japanese Patent Application No. JP2015-248365 with a priority date of Dec. 21, 2015, which is incorporated by reference herein.

TECHNICAL FIELD

The present invention relates to electronic devices in general, and in particular to an electronic device having a portable information equipment and an expansion unit to be attached to the portable information equipment.

BACKGROUND

Portable information equipment, such as a tablet personal computer (tablet PC), is light-weight and compact for better portability, but often has limited functions. For example, a tablet PC typically does not come with multiple input/output (I/O) ports for connecting to external devices, a high-capacity battery, etc.

When an expansion unit is connected to a tablet PC, a user often holds the tablet PC that is attached to the expansion unit in a similar manner to holding a typical tablet PC without an expansion unit. With the above-mentioned configuration, the expansion unit is required to be securely attached to the tablet PC in order to prevent any type of rattling. Especially in the case of a tablet PC, since a tablet PC is thin at the lateral face, so a more stable and rigid attachment structure is required for an expansion unit to avoid rattling during normal usage.

The present disclose provides an expansion unit capable of being securely attached to a portable information equipment unit and without rattling.

SUMMARY

In accordance with an embodiment of the present disclosure, an electronic device includes portable information equipment having an attached part at one lateral face, and an expansion unit having an attachment part to be attached detachably to the attached part. The expansion unit is configured to expand a function of the portable information equipment, the expansion unit being attachable to the portable information equipment by attaching the attachment part to the attached part.

The attachment part includes a hook configured to be movable in an engagement direction from a non-engagement position to an engagement position, in the non-engagement position, the hook being inserted into an engagement hole disposed at the attached part of the portable information equipment, in the engagement position, the hook engaging with the engagement hole, the hook being configured to be further movable in a pulling direction of pulling the portable information equipment toward the expansion unit, the pulling direction being orthogonal to the engagement direction; and a manipulation member to move the hook in the engagement direction and in the pulling direction.

All features and advantages of the present disclosure will become apparent in the following detailed written description.

BRIEF DESCRIPTION OF THE DRAWINGS

The invention itself, as well as a preferred mode of use, further objects, and advantages thereof, will best be understood by reference to the following detailed description of an illustrative embodiment when read in conjunction with the accompanying drawings, wherein:

FIG. 6A is a cross-section view of the hook of the expansion unit;

FIG. 6B is a side view of the lever of the expansion unit;

FIG. 7A is the cross-section view, and FIG. 7B is a side view of the lever;

FIG. 8A is the cross-section view, and FIG. 8B is a side view around the lever;

DETAILED DESCRIPTION

Figure 1:
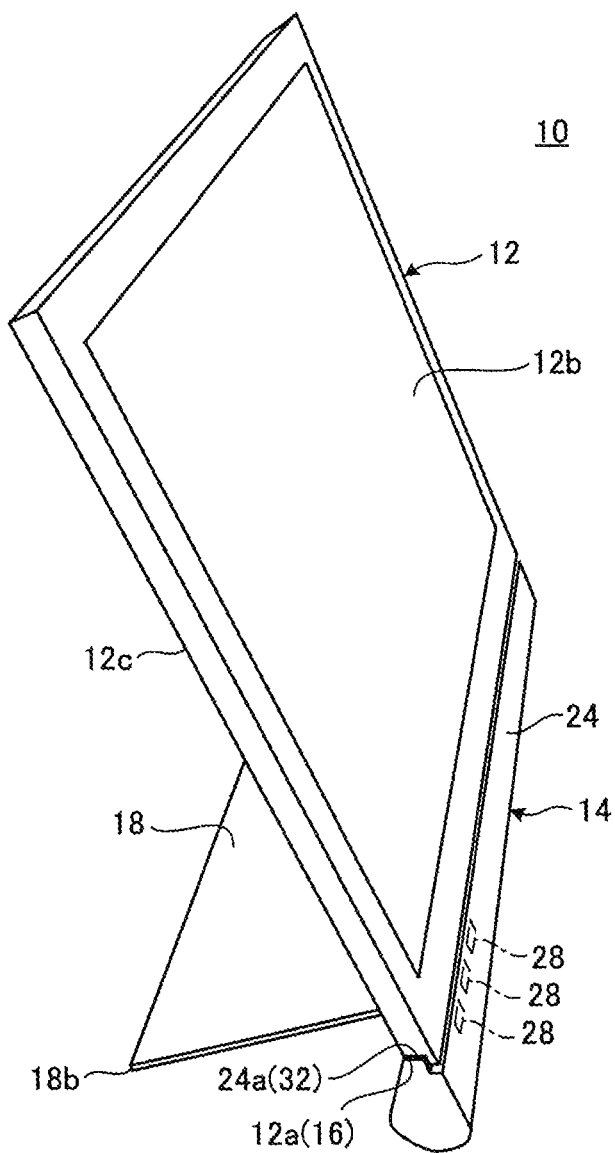
FIG. 1 is a perspective view of an electronic device attached to an expansion unit according to one embodiment of the present invention.
Figure 2:
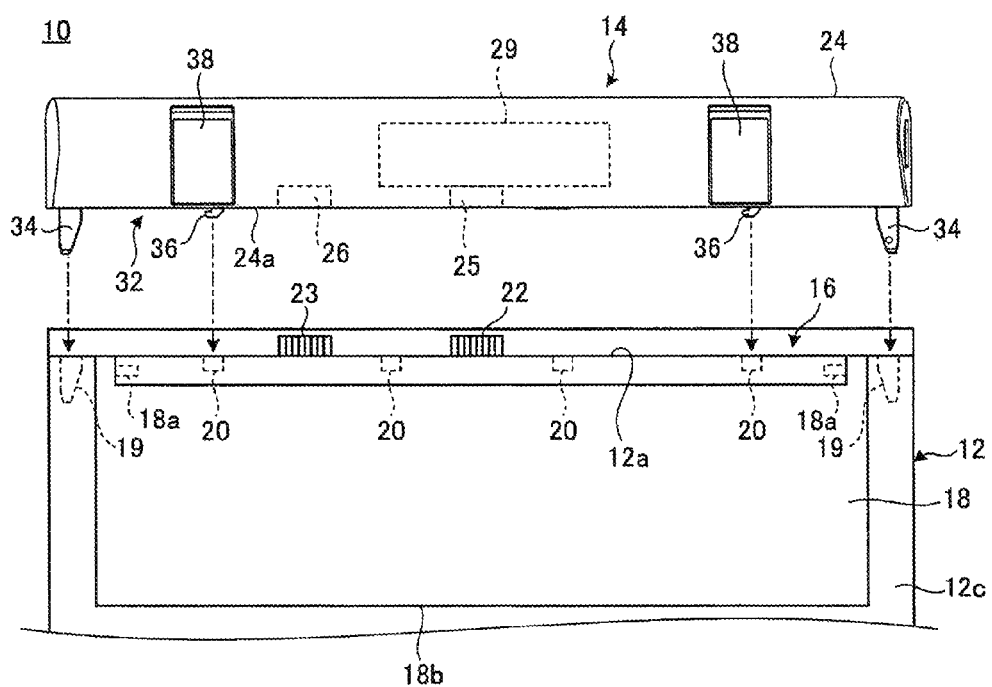
FIG. 2 is a bottom view of the expansion unit shown in FIG. 1 that is detached from the tablet PC.

FIG. 1 is a perspective view of an electronic device 10 having a tablet PC 12 attached to an expansion unit 14 according to one embodiment of the present invention. FIG. 2 is a bottom view of the expansion unit 14 being detached from the tablet PC 12.

The electronic device 10 is configured so that the expansion unit 14 is attached to one lateral face 12a of the tablet PC 12 as portable information equipment so as to expand and enhance the functions of the tablet PC 12, such as the power-supply function and the expansion function with peripherals and network. Instead of tablet PC 12, the portable information equipment may be a laptop PC, a smart phone or the like.

As shown in FIGS. 1-2, the tablet PC 12 has a display 12b that is a liquid crystal display functioning as a touch panel. The tablet PC 12 internally has a board and various electronic components not illustrated, such as an arithmetic unit and a memory. The lateral face 12a of the tablet PC 12 includes an attached part 16, to which the expansion unit 14 is attached.

The attached part 16 includes a pair of positioning holes 19, 19 disposed at both ends on the left and right of the tablet PC 12 and four engagement holes 20 disposed between the left and right positioning holes 19, 19. At a substantially center of the lateral face 12a, terminals 22, 23 as connectors protrude from the face. The terminal 22 is used for electrical connection between the tablet PC 12 and an external power-supply unit or the expansion unit 14, for example. The terminal 23 is used for electrical connection between the tablet PC 12 and the expansion unit 14, for example.

The tablet PC 12 includes a stand 18 on its rear face 12c that is the opposite face of the display 12b. The stand 18 is a rectangular plate that can rotate about a rotary shaft 18a. The rotary shaft 18a is close to the lateral face 12a and has the axial direction along the lateral face 12a. When rotating an open end 18b of the stand 18 by substantially 90 degrees about the rotary shaft 18a so as to move away from the rear face 12c, the stand 18 protrudes from the rear face 12c substantially perpendicularly. Thereby, the stand 18 can hold the tablet PC 12 so that the tablet PC 12 can stand while having a desired standing posture as shown in FIG. 1, for example.

The expansion unit 14 is a cartridge type unit, which includes a chassis 24 and connection terminals 25 and 26 exposed to an outer face of the chassis 24. The chassis 24 is a rod shaped to be narrower toward one lateral face and having a substantially tear-drop shape in cross section that extends along the lateral face 12a of the tablet PC 12. The chassis 24 has a longitudinal dimension that is substantially the same as the width of the lateral face 12a of the tablet PC 12.

When the expansion unit 14 is connected to the terminal 22 (23) of the tablet PC 12 at the connection terminal 25 (26), an input/output (I/O) port 28 (see FIG. 1) or a battery unit 29 (see FIG. 2) is added on the tablet PC 12. The expansion unit 14 may come with a connector conforming to a predetermined connection standard, such as HDMI or USB.

Figure 3:
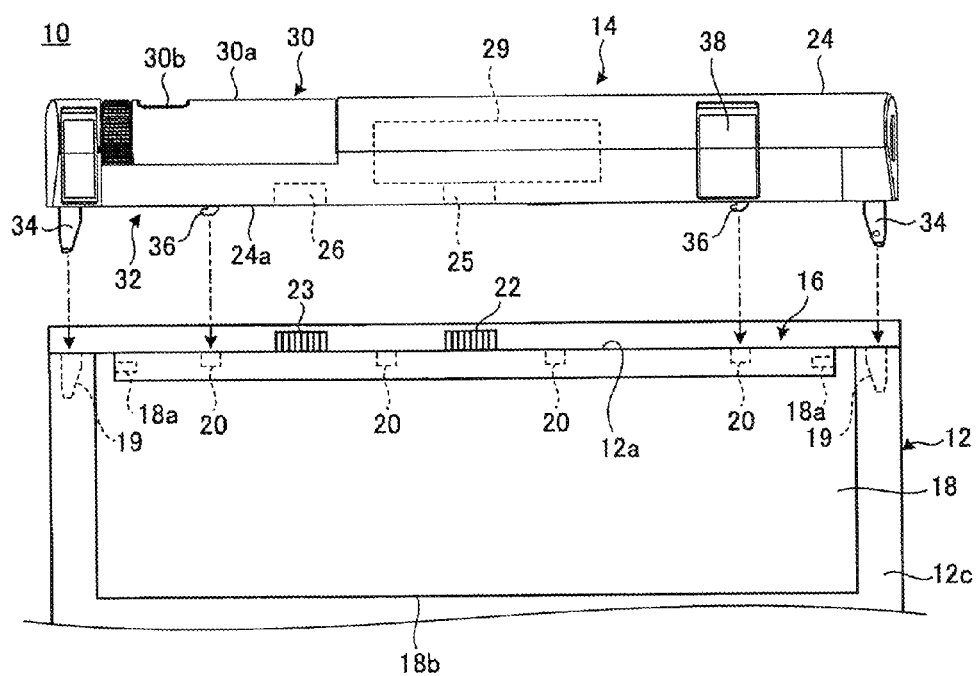
FIG. 3 shows the expansion unit shown in FIG. 2 including a projector module.

The expansion unit 14 may come with a projector module 30 as shown in FIG. 3. The projector module 30 includes a tubular chassis 30a that can rotate relative to the chassis 24 and a projection lens 30b disposed on the outer periphery of the tubular chassis 30a, for example. The expansion unit 14 may come with a camera module not illustrated, such as a two-dimensional (2D) camera or a three-dimensional (3D) camera, instead of the projector module 30.

At a lateral face 24a of the chassis 24 at the narrowed end, an attachment part 32 is disposed for attachment and detachment to/from the attached part 16 of the tablet PC 12. The attachment part 32 includes a pair of positioning protrusions 34, 34 that are inserted into the positioning holes 19 of the tablet PC 12 and a pair of hooks 36, 36 that engage with two engagement holes 20 of the four engagement holes 20. A pair of left and right levers (manipulation members) 38, 38 for attachment/detachment operation are disposed rotatably on the outer face of the chassis 24. These levers 38 are for manipulating the corresponding hooks 36 located close to them.

Figure 4:
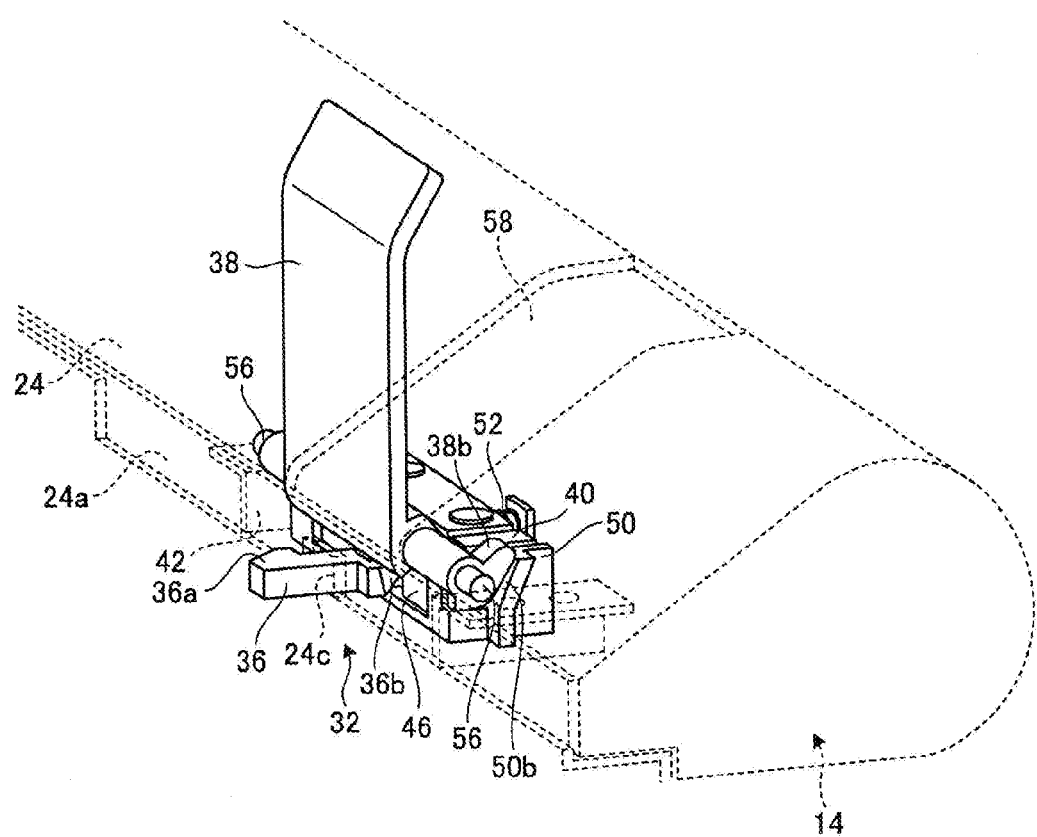
FIG. 4 is a perspective view of an attachment part of the expansion unit.
Figure 5:
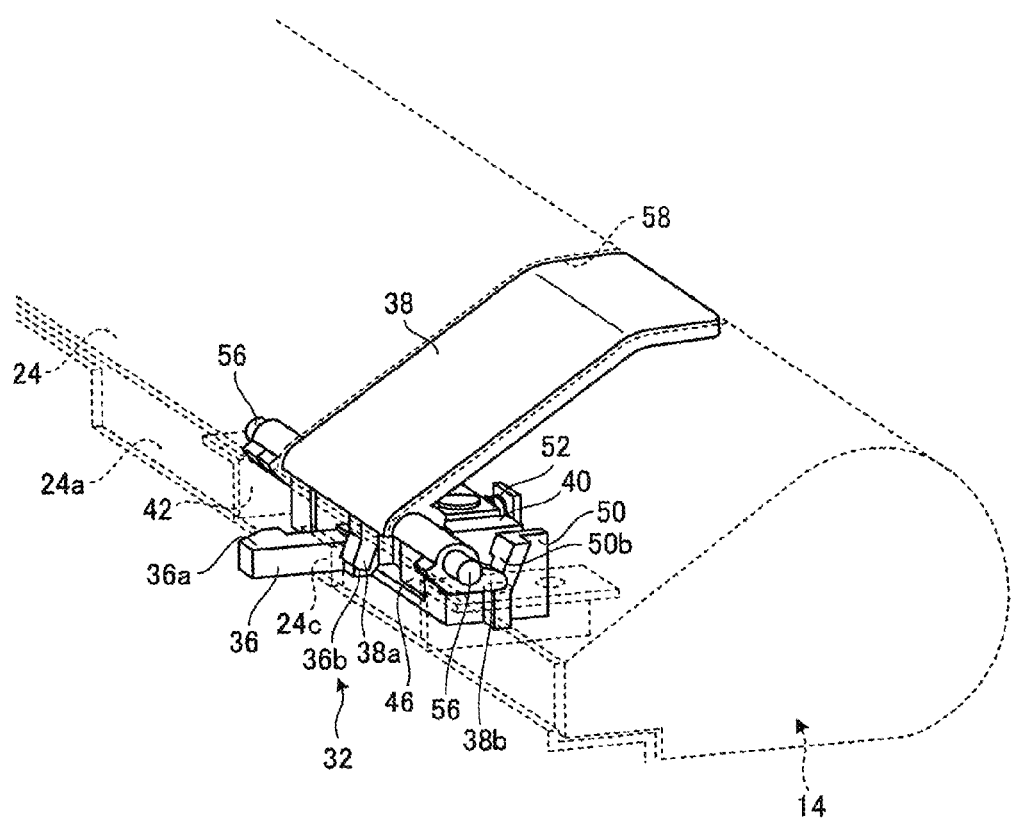
FIG. 5 is a perspective view of a lever that is folded down from the state shown in FIG. 4.
Figures 7A, 7B:
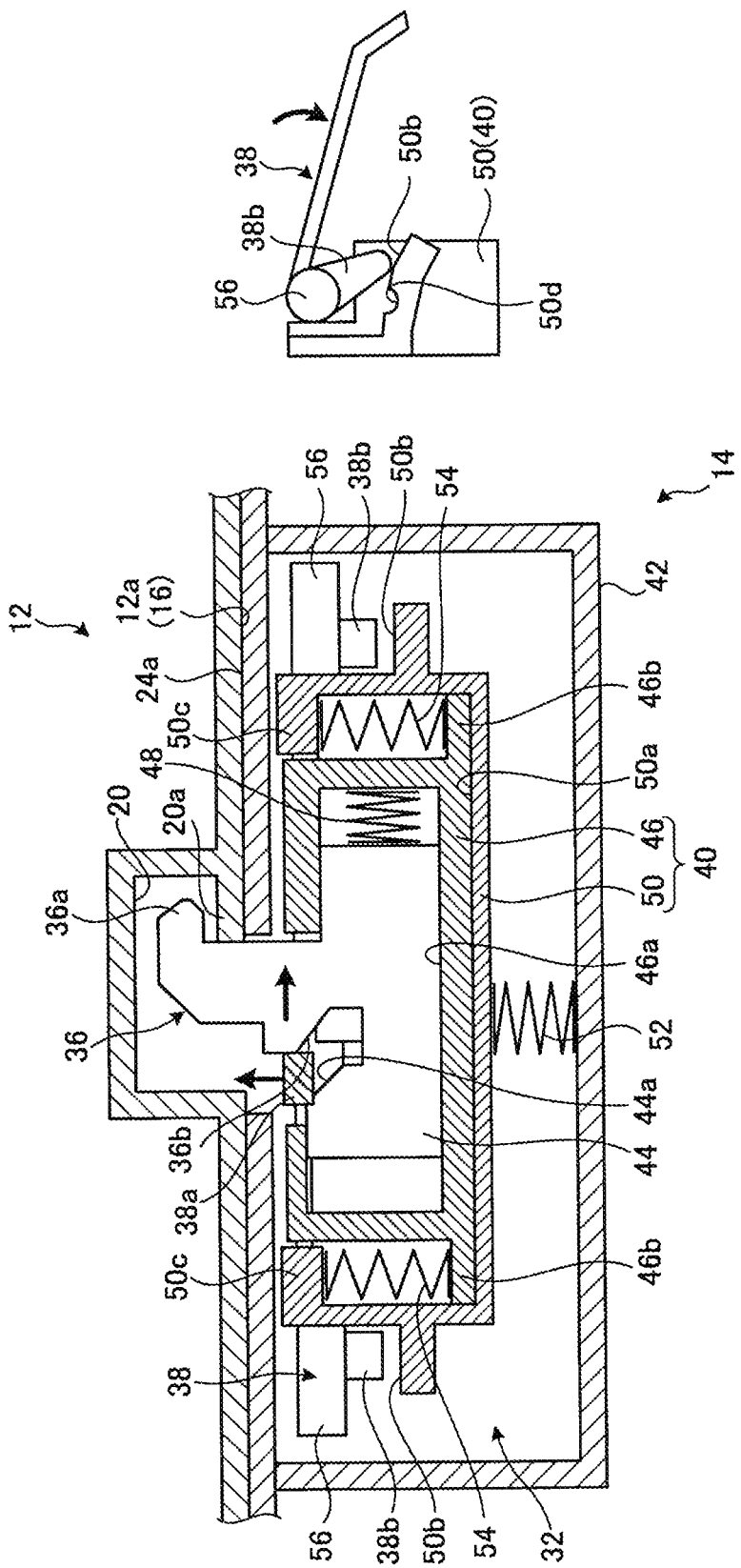
FIGS. 7A-7B show the lever being fold down from the state of FIG. 6, where
Figures 8A, 8B:
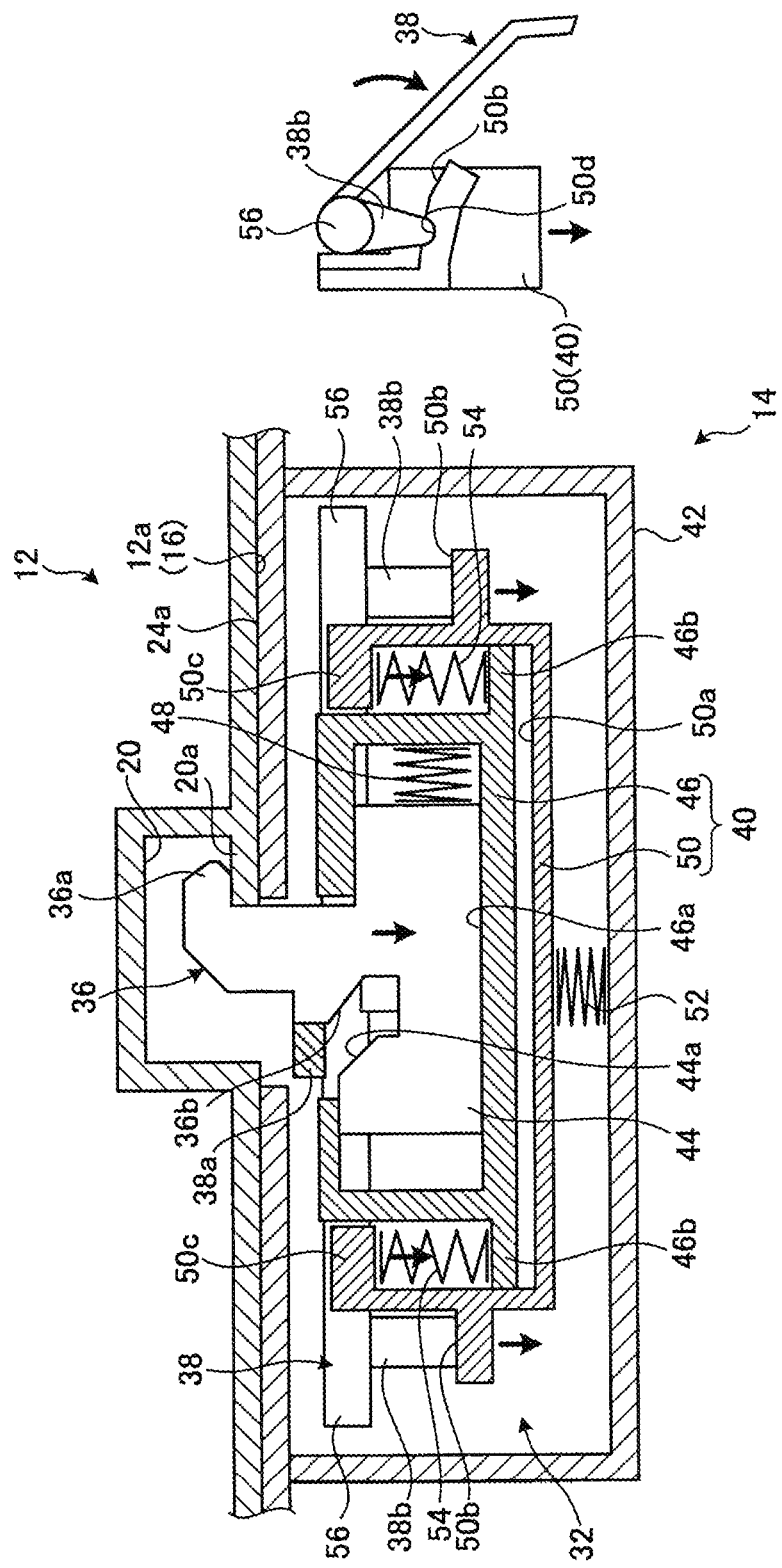
FIGS. 8A-8B show the lever being fold further down from the state of FIG. 7 in order to let the hook engage with the engagement hole completely, where
Figure 9:
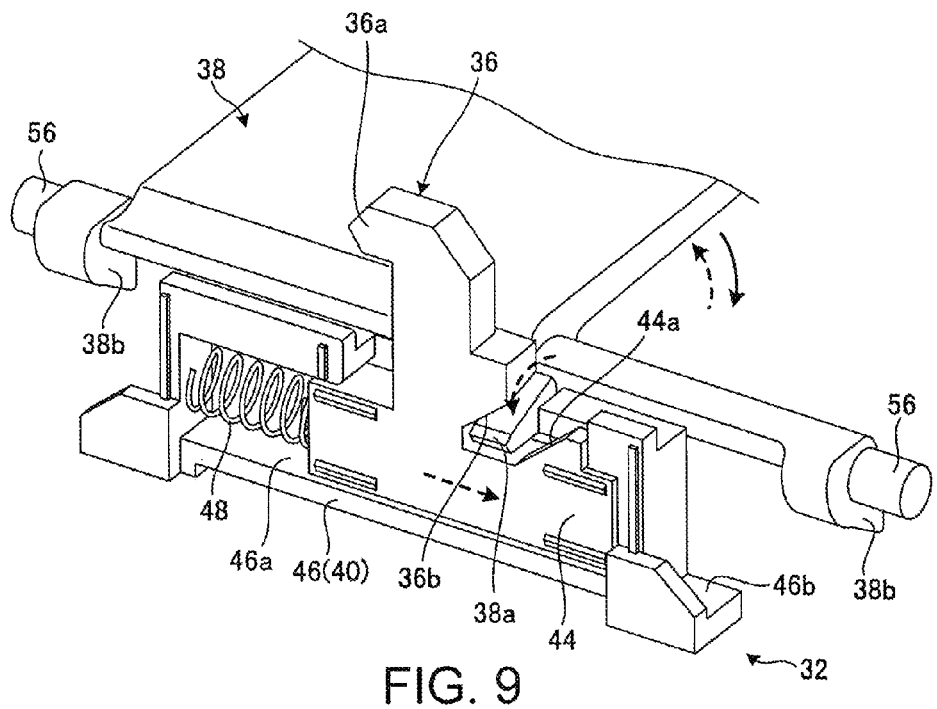
FIG. 9 is an enlarged perspective view of a major part of the attachment part when the lever is raised up.
Figure 10:
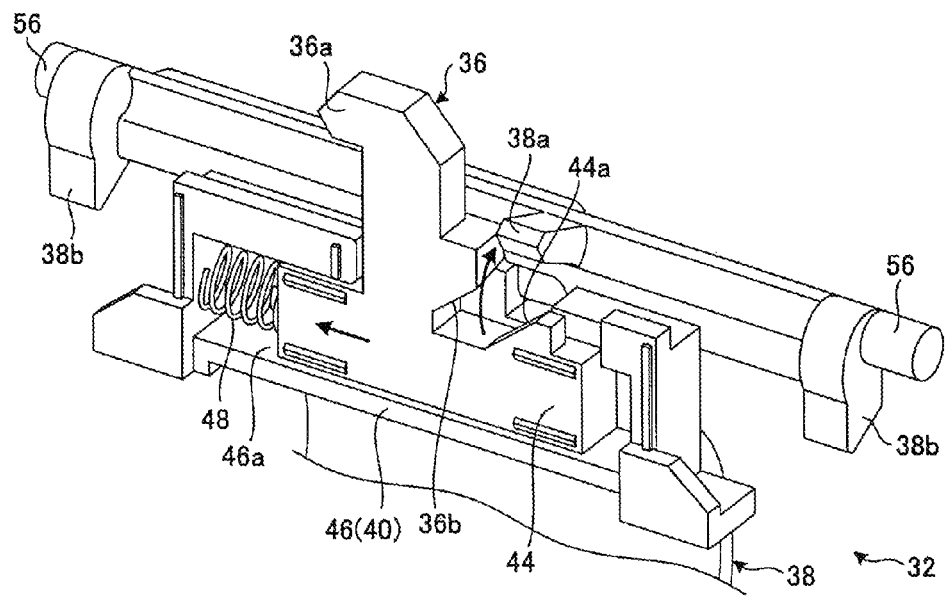
FIG. 10 is an enlarged perspective view of a major part of the attachment part when the lever is folded down from the state shown in FIG. 9.

FIG. 4 is a perspective view of the attachment part 32 of the expansion unit 14, which shows the lever 38 that is raised up. FIG. 5 is a perspective view of the lever 38 that is folded down from the state shown in FIG. 4. FIGS. 6 to 8 illustrate the operation of engaging the hook 36 of the expansion unit 14 with the engagement hole 20 of the tablet PC 12. Specifically, FIGS. 6A, 7A and 8A show the planar cross sections, and FIGS. 6B, 7B and 8B are the side views around the lever 38. FIG. 9 is an enlarged perspective view of the attachment part 32 when the lever 38 is raised up, and FIG. 10 is an enlarged perspective view of the attachment part 32 when the lever 38 is folded down from the state shown in FIG. 9.

As shown in FIGS. 4 to 8, the attachment part 32 includes each of the hooks 36, a base member 40 to hold the hook 36, and the lever 38 to move the hook 36 via the base member 40. These hook 36, base member 40 and lever 38 are attached to the inside of the chassis 24 via a bracket 42, and the bracket 42 is prepared by bending a thin metal plate into a substantially U-letter shape (see FIG. 4).

The hook 36 protrudes from a slot 24c formed along the longitudinal direction of the lateral face 24a of the chassis 24, and the hook 36 has an engagement claw 36a at its protruding end. The hook 36 has a protrusion on the lateral face at a part close to the base end, and this protrusion has a lateral face defining a first hook cam face (hook cam face) 36b that is pressed by a hook-pressing part 38a of the lever 38. The first cam face 36b is an inclined face that is inclined in the opposite direction of the engagement claw 36a from the base end to the protruding end of the hook 36.

On the side of the base end of the hook 36, a substantially cuboid slider part 44 is formed integrally with the hook. At a position of the slider part 44 corresponding to the root of the hook 36, a second hook cam face 44a is formed so as to be opposed to the first hook cam face 36b. The second hook cam face 44a is an inclined face that is inclined toward the engagement claw 36a from the protruding end to the base end of the hook 36. The second hook cam face 44a is pressed by the hook-pressing part 38a of the lever 38 when the lever 38 rotates in the reverse direction from the first hook cam face 36b (see FIGS. 9 and 10).

The hook 36 is supported movably to the left and right (the direction along the longitudinal direction of the one lateral face 24a) relative to the base member 40 via the slider part 44. A coil spring (first elastic member) 48 intervenes between one lateral face of the slider part 44 and a relay member 46 making up the base member 40. The coil spring 48 always biases the hook 36 against the base member 40 in the engagement cancellation direction (to the left in FIG. 6) that is in the opposite direction from the engagement direction (to the right in FIG. 6).

The base member 40 includes: a base slider member 50 and the relay member 46. The base slider member 50 is supported movably to the forward and the backward (the direction moving toward and away from the one lateral face 24a) inside the bracket 42, and the relay member 46 is stored inside of the base slider member 50 so as to be movable to the forward and the backward relative to the base slider member 50.

The base slider member 50 has a recess 50a at the center to store the relay member 46, and has a base cam face 50b at each of the left and right lateral faces. The base cam face 50b is an inclined face that is inclined to gradually move away from the lever 38 from the base end to the protruding end of the hook 36. These base cam faces 50b are pressed by a pair of left and right base pressing parts 38b, 38b, respectively, disposed at the levers 38.

A coil spring (second elastic member) 52 intervenes between the face of the base slider member 50 on the opposite side from the hook 36 and the internal face of the bracket 42. The coil spring 52 always biases the base slider member 50 (base member 40) against the bracket 42 (chassis 24) in the direction in which the hook 36 protrudes from the slot 24c (upward in FIG. 6).

The relay member 46 internally has a storage space 46a in which the slider part 44 of the hook 36 is stored slidably. Flange parts 46b protrude from the left and right lateral faces of the relay member 46, and left and right flange parts 50c define the recess 50a of the base slider member 50. A coil spring (third elastic member) 54 intervenes between each of the flange parts 46b and the corresponding flange part 50c. Each coil spring 54 always biases the relay member 46 against the base slider member 50 in the direction in which the hook 36 is pulled into the slot 24c (downward in FIG. 6).

The levers 38 are supported rotatably at the chassis 24 via left and right rotary shafts 56. Along a rotary base-end part of the lever 38 provided with the rotary shaft 56, one of the base pressing parts 38b, the hook-pressing part 38a, and the other base pressing part 38b are disposed in the axial direction in this order. The levers 38 lie over the outer face of the chassis 24, and are disposed rotatably from the attachment position (see FIGS. 5 and 8B) where the levers are stored in their lever storage recesses 58 formed on the outer face to the attachment cancellation position (see FIGS. 4 and 6B) where the levers stand from the outer face of the chassis 24. Thereby, the hooks 36 can be manipulated smoothly, and when the levers 38 are at the attachment positions, they can be integral with the chassis 24, and so the levers do not degrade the appearance of the expansion unit 14.

Figure 11:
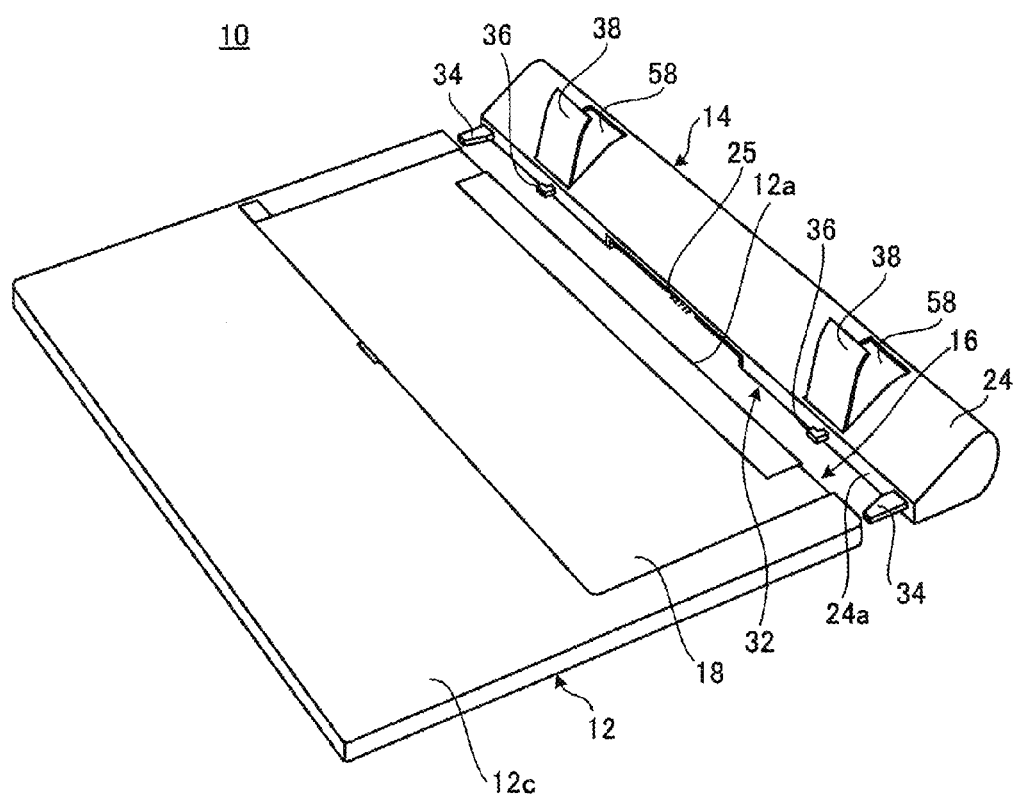
FIG. 11 is a perspective view of the expansion unit being unattached from the tablet PC.
Figure 12:
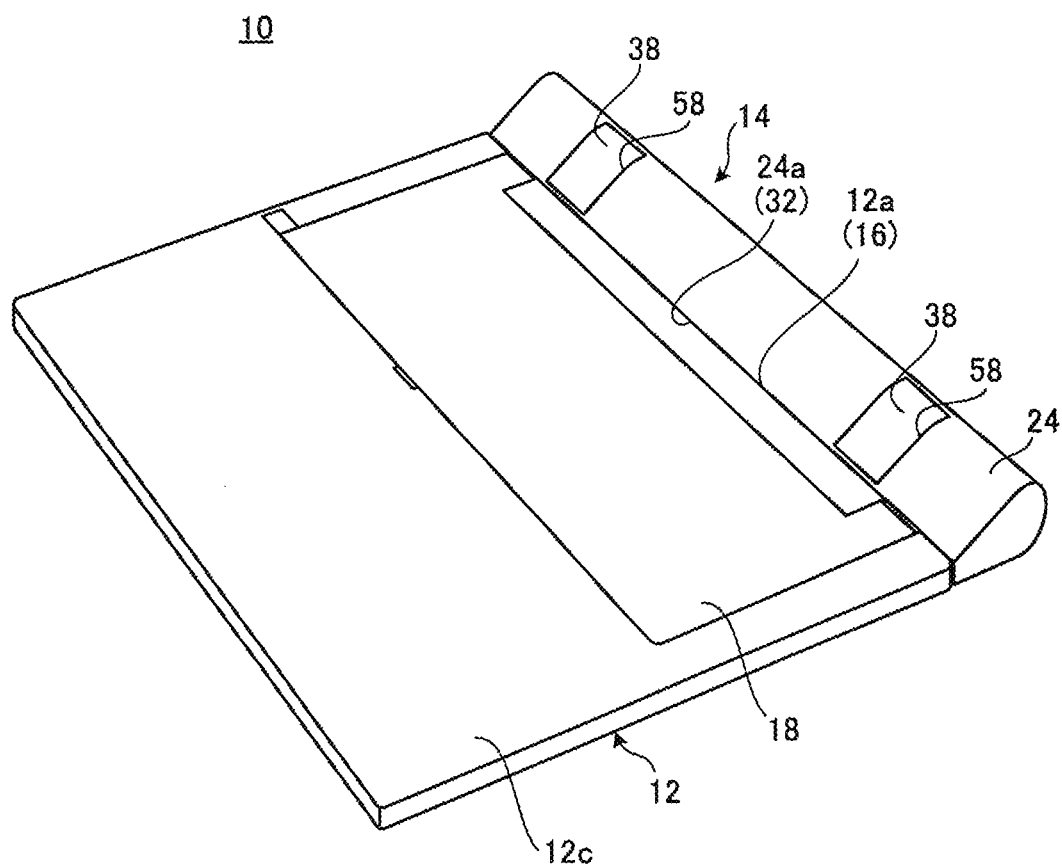
FIG. 12 is a perspective view of the expansion unit being attached to the tablet PC.

FIG. 11 is a perspective view showing the expansion unit 14 that is about to be attached to the tablet PC 12. FIG. 12 is a perspective view of the expansion unit 14 attached to the tablet PC 12 from the state shown in FIG. 11.

As shown in FIG. 11, when the expansion unit 14 is attached to the tablet PC 12, the lever part of each of the levers 38 is raised from the outer face of the chassis 24 to be at the attachment cancellation position. In this state, as shown in FIGS. 4, 6A and 6B, pressure to the first hook cam face 36b and the base cam faces 50b from the hook-pressing part 38a and the base pressing parts 38b of the lever 38 is canceled. Therefore, the base member 40 of the attachment part 32 is at the forward-movement position before the base member 40 makes the hook 36 protrude from the slot 24c due to the biasing force from the coil spring 52, and at the same time, the hook 36 is at the non-engagement position where the engagement claw 36a retracts from the opening edge (latching piece) 20a of the engagement hole 20 due to the biasing force of the coil spring 48.

Subsequently, the positioning protrusions 34 and the hooks 36 making up the attachment part 32 of the expansion unit 14 are inserted into the corresponding positioning hole 19 and the engagement hole 20 making up the attached part 16 of the tablet PC 12, and the connection terminal 25 (26) is connected to the terminal 22 (23).

Next as shown in FIG. 7B, the lever part of each of the levers 38 is pressed down against the outer face of the chassis 24. Then, as shown in FIGS. 7A, 7B and 10, the hook-pressing part 38a of the lever 38 presses the first hook cam face 36b so as to move the hook 36 in the engagement direction with the engagement hole 20 against the biasing force from the coil spring 48 until the engagement claw 36a engages with the opening edge 20a of the engagement holes 20 at the engagement position.

As shown in FIGS. 5, 8B and 12, the lever part of each of the levers 38 is pressed down against the outer face of the chassis 24 until the lever 38 is at the attachment position where the lever is stored in the lever storage recess 58 formed on the outer face of the chassis 24. Then, the base pressing parts 38b of the lever 38 presses the base cam faces 50b so as to move the base member 40 to the retracting position against the biasing force from the coil spring 52 (see FIG. 8A). As a result, the hook 36 moves in the pulling direction in which the engagement claw 36a of the hook 36 pulls the opening edge 20a of the engagement hole 20 toward the expansion unit 14 (downward in FIG. 8A).

At this time, the base member 40 includes the relay member 46 that holds the hook 36 not to move to the forward and backward and the base slider member 50 that holds the relay member 46 to be movable to the forward and backward, and the coil springs 54 intervene between the relay member 46 and the base slider member 50. With this configuration, when the base pressing parts 38b of the lever 38 presses the base cam faces 50b, the base slider member 50 moves the relay member 46 and accordingly the hook 36 in the pulling direction via the coil springs 54 (see FIG. 8A). Therefore, the engagement claw 36a of the hook 36 elastically biases the opening edge 20a of the engagement hole 20 in the pulling direction via the coil springs 54, and so the hook 36 engages with the engagement hole firmly without rattles.

In this state, the hook-pressing part 38a of the lever 38 comes into contact with the lateral face of the protrusion defining the first hook cam face 36b of the hook 36 (see FIGS. 8A and 10), which regulates the movement of the hook 36 in the engagement cancellation direction. As a result, the expansion unit 14 can be attached to the tablet PC 12 integrally and stably. In this state, each base pressing part 38b of the lever 38 is fitted into the recess 50d on the base cam face 50b of the base slider member 50 as shown in FIG. 8B. Thereby, the lever 38 can be held at the attachment position stably without rattles.

When the attachment shown in FIG. 8A is canceled, the lever 38 is raised up to the attachment cancellation position. Then as shown with the dashed arrow in FIG. 9, the hook-pressing part 38a of the lever 38 presses the second hook cam face 44a of the hook 36 this time. Thereby the movement regulation of the hook 36 in the engagement cancellation direction by the hook-pressing part 38a of the lever 38 is canceled, and at the same time the hook 36 moves in the engagement cancellation direction. At this time, the hook 36 is also biased to the engagement cancellation direction by the coil spring 48. As a result, as shown in FIGS. 4 and 6A, the engagement of the hook 36 with the engagement holes 20 is canceled. Then the expansion unit 14 can be detached from the tablet PC 12 by separating the expansion unit 14 from the tablet PC 12.

Meanwhile the tablet PC 12 making up the electronic device 10 according to the present embodiment may be used alone without being attached to the expansion unit 14. In this state, unevenness or bumpy shapes of the attachment part 16 as well as the terminals 22 or 23 not in use will be exposed to the one lateral face 12a. Then, the electronic device 10 is configured so that, when the tablet PC 12 is used alone, a cover member 60 (see FIG. 13) may be attached to the attached part 16 instead of the expansion unit 14. The tablet PC 12 can keep the appearance of the one lateral face 12a by the cover member 60 attached, and the terminal 22 or 23 not in use can be protected by the cover member 60.

The following describes the configuration of the cover member 60 to be attached to the attached part 16 of the tablet PC 12 instead of the expansion unit 14.

Figure 13:
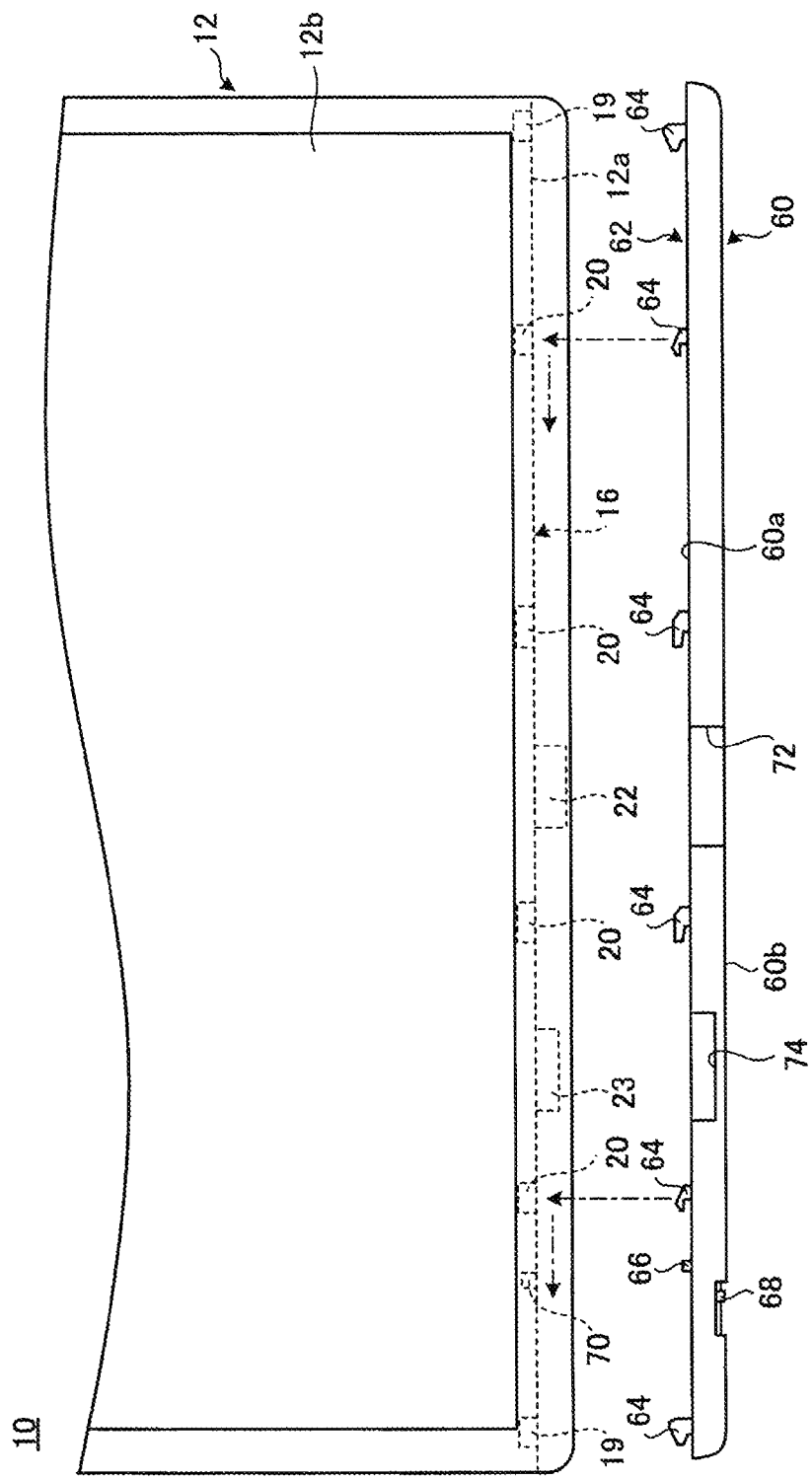
FIG. 13 is a bottom view of the tablet PC that is unattached from the cover member.
Figure 14:
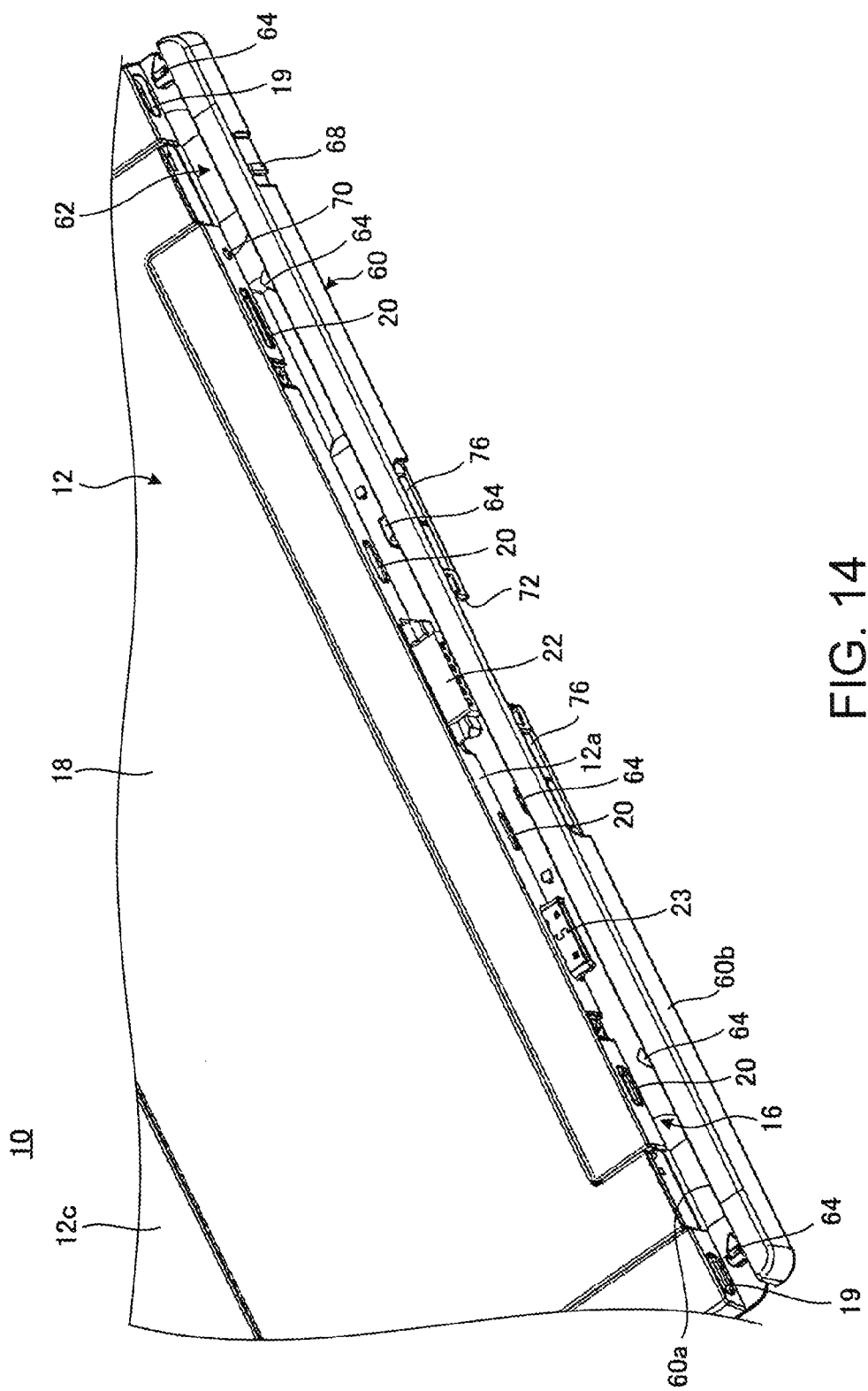
FIG. 14 is a perspective view of the cover member and the tablet PC shown in FIG. 13 viewed from the rear.
Figure 15:
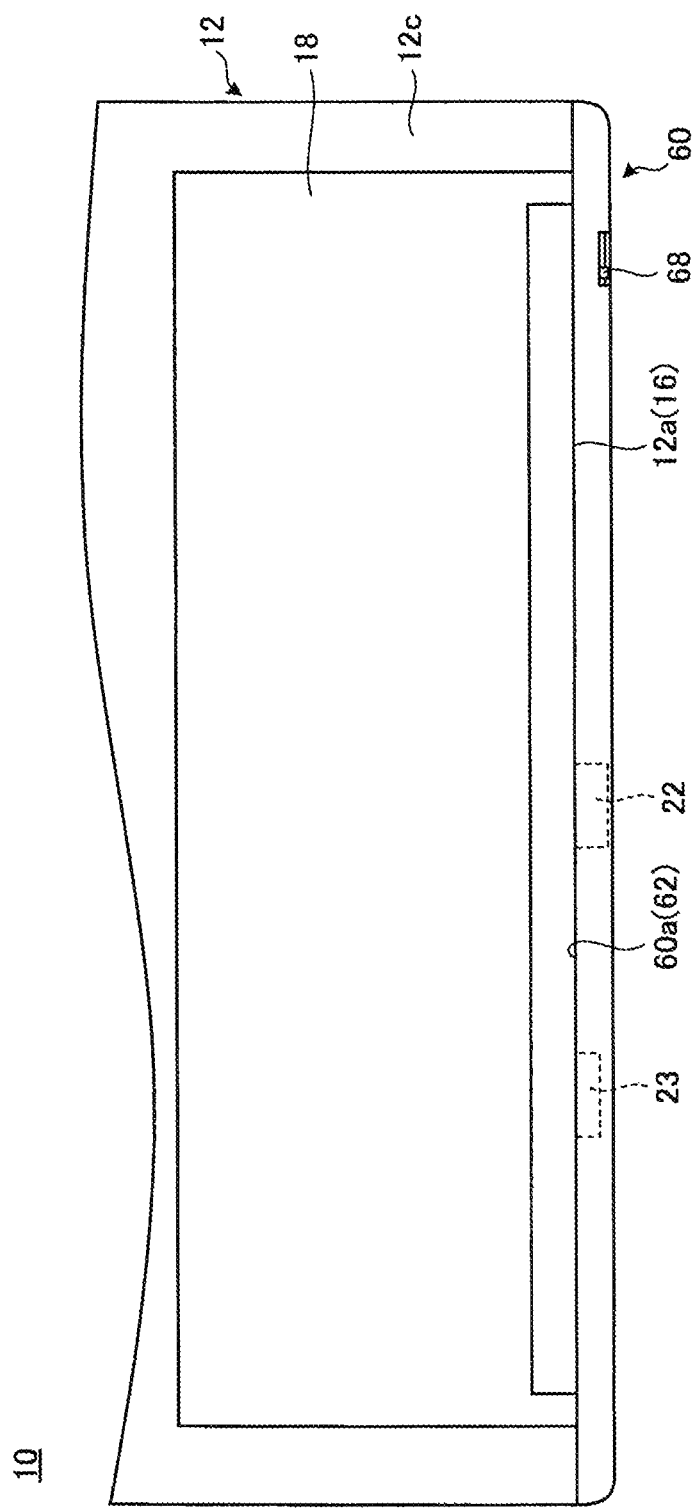
FIG. 15 is a bottom view of the cover member attached to the tablet PC.

FIG. 13 is a bottom view of the tablet PC 12 that is about to be attached to the cover member 60. FIG. 14 is a perspective view of the cover member 60 and the tablet PC 12 shown in FIG. 13 viewed from the rear 12c. FIG. 15 is a bottom view of the cover member 60 attached to the tablet PC 12.

As shown in FIGS. 13 to 15, the cover member 60 is a rod-shaped edge member that extends along the one lateral face 12a of the tablet PC 12. The cover member 60 has the longitudinal dimension that is substantially the same as the width dimension of the one lateral face 12a of the tablet PC 12 so as to define the outer face of the tablet PC 12 when the cover member 60 is attached to the tablet PC 12. One lateral face 60a of the cover member 60 includes an attachment part 62 that is attached/detached to/from the attached part 16 of the tablet PC 12.

The attachment part 62 includes six hooks 64 arranged side by side along the longitudinal direction of the lateral face 60a so as to protrude from the lateral face 60a, and a locking pin 66 protruding retractably from the lateral face 60a. At a position on the other lateral face 60b on the opposite side from the lateral face 60a and close to the locking pin 66, a locking cancellation member 68 is disposed, and the locking cancellation member 68 is to cancel the locking of the locking pin 66. Four hooks 64 disposed at the center engage with the engagement holes 20 of the tablet PC 12. The hooks 64 at both of the left and right ends engage with the positioning hole 19 of the tablet PC 12. That is, the positioning hole 19 function as the engagement holes 19 for the cover member 60, and have a structure having the opening edge 20a similar to the engagement holes 20 (see FIG. 16). The locking pin 66 is inserted into a locking hole 70 formed at the lateral face 12a of the tablet PC 12.

The cover member 60 has a relief hole 72 at the position corresponding to the terminal 22 when it is attached to the tablet PC 12, and a relief recess 74 at the position corresponding to the terminal 23. The relief hole 72 is a hole for penetration of the terminal 22, which allows the terminal 22 to be available from the other lateral face 60b that makes up the outer shape of the tablet PC 12 when the cover member 60 is attached to the tablet PC 12. The relief recess 74 is to store and protect the terminal 23, which prevents the terminal 23 from being exposed to the other lateral face 60b that makes up the outer shape of the tablet PC 12 when the cover member 60 is attached to the tablet PC 12.

A pair of magnets 76, 76 is disposed at the other lateral face 60b of the cover member 60 so as to sandwich the relief hole 72 therebetween at the center. These magnets 76 are used when an external device such as a keyboard unit not illustrated is attached to the tablet PC 12 with the cover member 60 attached thereto, for example.

The following describes a specific configuration of the cover member 60 for attachment/detachment to/from the tablet PC 12.

Figure 16:
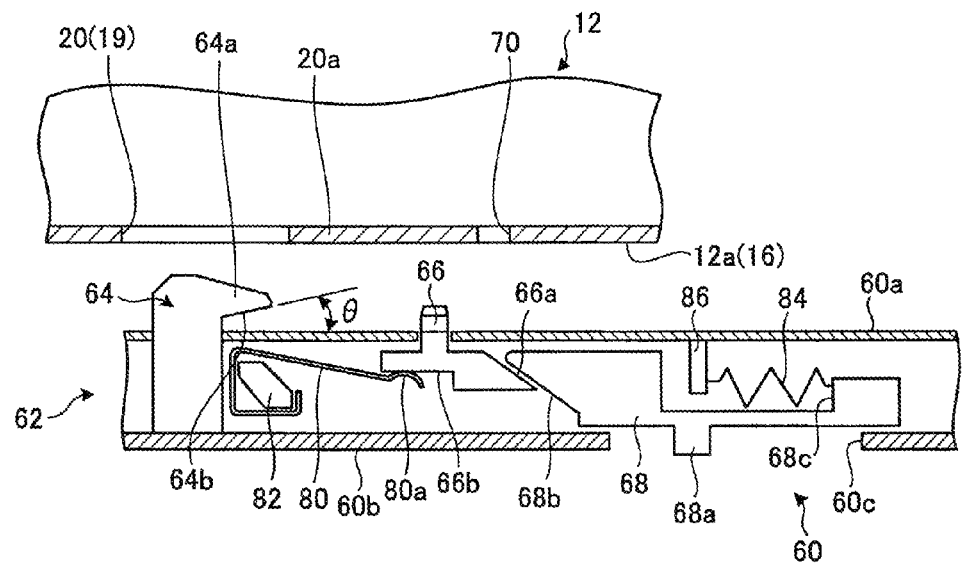
FIG. 16 is a cross-section view showing the hook of the cover member that is about to be inserted into the engagement hole of the tablet PC.
Figure 17:
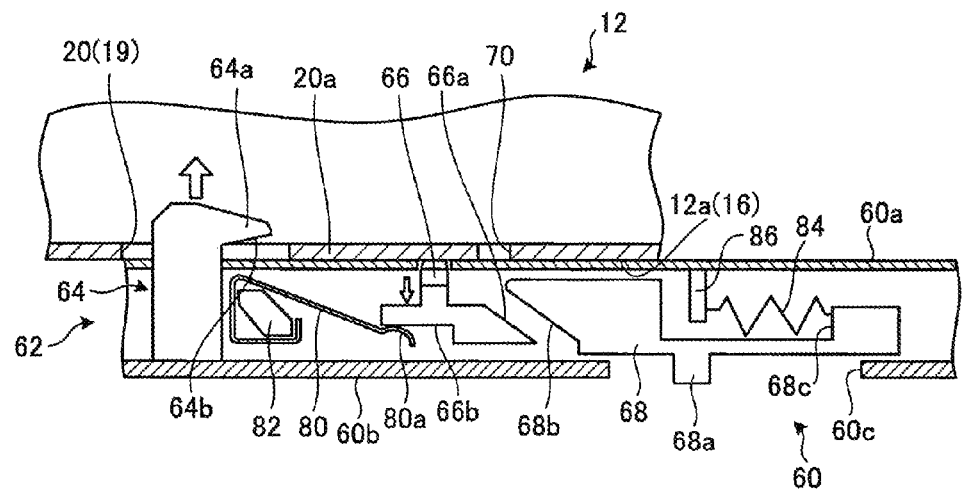
FIG. 17 is a cross-section view showing the hook inserted into the engagement hole from the state shown in FIG. 16.
Figure 18:
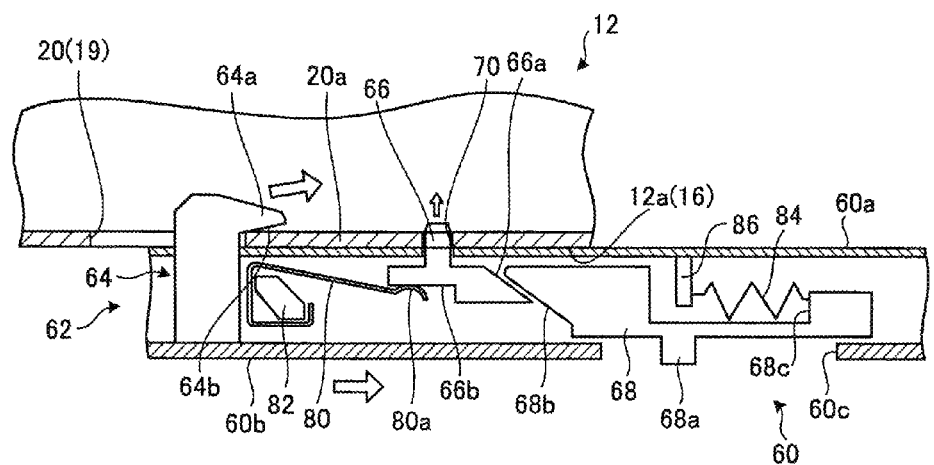
FIG. 18 shows a cross-section view of the cover member slid from the state shown in FIG. 17 in order to let the hook engage with the engagement hole completely.
Figure 19:
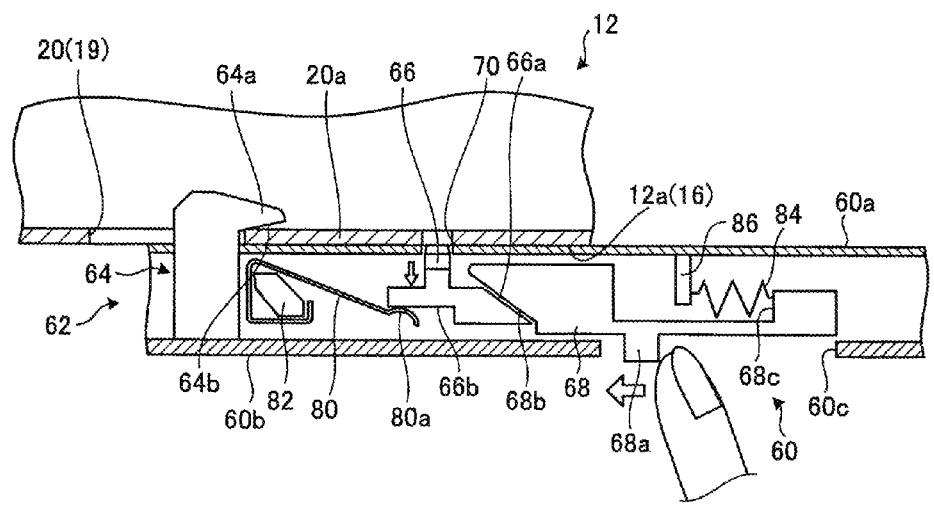
FIG. 19 shows a cross-section view of the hook of the cover member engaged with the engagement hole of the tablet PC, and the manipulation of the lock cancellation member.

FIGS. 16 to 18 are the cross-section views showing the operation of engaging the hooks 64 of the cover member 60 with the engagement holes 20 (19) of the tablet PC 12. FIG. 19 is the cross-section view showing the operation of the lock cancellation member 68 when the hooks 64 of the cover member 60 engage with the engagement holes 20 (19) of the tablet PC 12.

As shown in FIGS. 16 to 19, the attachment part 62 includes a hook 64 that engages with the engagement hole 20 (19), the locking pin 66 to be inserted into the locking hole 70, and the lock cancellation member 68 to cancel the insertion of the locking pin 66 into the locking hole 70.

The hook 64 is fixed in the chassis of the cover member 60 at its base end. The protruding end of the hook 64 protrudes from the lateral face 60a, and the hook 64 has an engagement claw 64a at this protruding end. The engagement claw 64a is configured to be latched with the opening edge 20a of the engagement hole 20 by sliding the lateral face 60a of the cover member 60 along the lateral face 12a of the tablet PC 12.

The engagement claw 64a to be latched with the opening edge 20a has an inclined face 64b at its internal face. The inclined face 64b is inclined toward the tablet PC 12 in the engagement direction of the hook 64 with the opening edge 20a (to the right in FIGS. 16 to 19). The inclining angle θ of the inclined face 64b may be set at a few degrees, for example, which may be set appropriately depending on the size of the hook 64, the thickness of the opening edge 20a of the engagement hole 20 (19), and the like.

The locking pin 66 comes out and retracts through the lateral face 60a of the cover member 60. A pressure-receiving face 66a and a spring supporting face 66b are disposed on the side of the base end of the locking pin 66 that is disposed in the cover member 60.

The pressure-receiving face 66a is an inclined face that is inclined to move gradually away from the lateral face 60a to the right along the lateral face 60a in FIG. 16. The spring supporting face 66b is a face parallel to the lateral face 60a. A leaf spring 80 having an action end 80a is disposed in the cover member 60, and the action end 80a comes in contact with the spring supporting face 66b for supporting. The leaf spring 80 has the action end 80a at its one end, and the other end of the leaf spring 80, which is bent like a scroll, is supported by a supporting piece 82 disposed in the chassis of the cover member 60. The action end 80a of the leaf spring 80 always biases the locking pin 66 via the spring supporting face 66b in the direction of letting the locking pin 66 protrude from the lateral face 60a (upward in FIG. 16).

As shown in FIG. 16, the pitch between the hook 64 and the locking pin 66 of the attachment part 62 is different from the pitch between the engagement hole 20 (19) and the locking hole 70. That is, when the hook 64 is inserted into the engagement hole 20 (19) as shown in FIG. 17, the locking pin 66 is not inserted into the locking hole 70, so that the locking pin 66 is embedded in the cover member 60 while being in contact with the lateral face 12a of the tablet PC 12.

The lock cancellation member 68 is disposed slidably to the left and right in the cover member 60. The lock cancellation member 68 includes a manipulation piece 68a disposed in an opening 60c formed at the other lateral face 60b of the cover member 60 and a pressing face 68b and a spring supporting face 68c disposed in the cover member 60.

The manipulation piece 68a is a protrusion that is movable to the left and right in the opening 60c along the longitudinal direction (left and right) of the other lateral face 60b of the cover member 60. The pressing face 68b is an inclined face that is inclined to gradually move close to the lateral face 60a to the left along the lateral face 60a in FIG. 16. The pressing face 68b is opposed to the pressure-receiving face 66a of the locking pin 66. The spring supporting face 68c is orthogonal to the lateral face 60a.

The spring supporting face 68c supports one end of a coil spring 84 disposed in the cover member 60. The other end of the coil spring 84 is supported by a supporting piece 86 disposed at the chassis of the cover member 60. The coil spring 84 always biases the lock cancellation member 68 via the spring supporting face 68c in the travelling direction of moving the pressing face 68b close to the pressure-receiving face 66a of the locking pin 66 along the lateral face 60a (to the left in FIG. 16).

The following describes the operation of the cover member 60 for attachment/detachment to/from the tablet PC 12.

When the cover member 60 is attached to the tablet PC 12, as shown in FIGS. 13 and 16, the hooks 64 of the attachment part 62 are set at the positions opposed to the corresponding engagement holes 19, 20 of the tablet PC 12. In this state, the lateral face 60a of the cover member 60 faces the lateral face 12a of the tablet PC 12, and both of the left and right ends of the lateral face 60a are shifted to one side (the engagement cancellation direction of the hooks 64 with the engagement holes 19, 20, to the right in FIG. 13) from both of the left and right ends of the tablet PC 12.

Subsequently as shown in FIG. 17, when the hooks 64 are inserted into the corresponding engagement holes 19, 20, then the lateral face 60a of the cover member 60 comes in contact with or is close to the lateral face 12a of the tablet PC 12. At this time, the locking pin 66 comes in contact with the lateral face 12a of the tablet PC 12, and retracts to the embedded position from the lateral face 60a against the biasing force of the leaf spring 80.

Next, the cover member 60 is slid in the engagement direction so as to let the hooks 64 engage with the engagement holes 19, 20. Then as shown in FIG. 18, the inclined face 64b of the engagement claw 64a of the hook 64 slides along the opening edge 20a of the engagement hole 19, 20, i.e., the wall part of the lateral face 12a at the edge of the engagement hole 19, 20. Thereby the hook 64 moves in the engagement direction while moving toward the tablet PC 12, and the cover member 60 itself with the hooks 64 fixed thereto also moves in the engagement direction while moving close to the tablet PC 12. That is, the cover member 60 is pulled toward the tablet PC 12 by the hooks 64.

Then as shown in FIG. 18, when the hooks 64 engage with the engagement holes 19, 20 completely and the locking pin 66 reaches the locking hole 70 after sliding along the lateral face 12a, then the locking pin 66 protrudes from the lateral face 60a due to the biasing force of the leaf spring 80 and is inserted into the locking hole 70.

Thereby the lateral face 60a of the cover member 60 comes in close contact with the lateral face 12a of the tablet PC 12 due to the guide action toward the tablet PC 12 by the hooks 64. At the same time, the movement of the hooks 64 from the engagement holes 19, 20 to cancel the engagement is regulated by the regulation action of the locking pin 66 inserted into the locking hole 70. As a result, the cover member 60 can be attached stably and integrally with the tablet PC 12.

When the attachment shown in FIG. 18 is canceled, the manipulation piece 68a of the lock cancellation member 68 is slid into the locking cancellation direction (to the left in FIG. 18) with a fingertip or the like. Then as shown in FIG. 19, the lock cancellation member 68 moves to the locking cancellation direction against the biasing force of the coil spring 84, and the pressing face 68b presses the pressure-receiving face 66a of the locking pin 66 while sliding along the pressure-receiving face 66a. Thereby, the locking pin 66 retracts to the embedded position from the lateral face 60a against the biasing force of the leaf spring 80, and therefore the engagement of the hooks 64 with the engagement holes 19, 20 can be canceled by sliding the cover member 60 in the engagement cancellation direction. As a result, the cover member 60 can be detached from the tablet PC 12 by separating the cover member 60 from the tablet PC 12.

As stated above, the electronic device 10 according to the present embodiment includes the tablet PC 12 that is portable information equipment with the attached part 16 disposed at the lateral face 12a, and the expansion unit 14 including the attachment part 32 that can be attached/detached to/from the attached part 16, the attachment part 32 being to expand the functions of the tablet PC 12. The attachment part 32 includes the hooks 36 and the levers 38. The hooks 36 are disposed movably in the engagement direction from the non-engagement position to the engagement position, and in the non-engagement position, the hooks 36 are inserted into the engagement holes 20 disposed at the attached part 16 of the tablet PC 12, and in the engagement position, the hooks 36 engage with the engagement holes 20. The hooks 36 are disposed movably to the pulling direction to pull the tablet PC 12 close to the expansion unit 14 as well, the pulling direction being orthogonal to the engagement direction. The levers 38 are manipulation members to move the hooks 36 in the engagement direction and in the pulling direction.

That is, when the expansion unit 14 is attached to the tablet PC 12, the levers 38 are manipulated so as to engage the hooks 36 with the engagement holes 20. When the hooks 36 engage with the engagement holes 20, such engaged hooks 36 bring the tablet PC 12 and the expansion unit 14 closer to each other to be attached. Therefore, even in the case of portable information equipment as in the tablet PC 12 having a thin lateral face 12a, the expansion unit 14 can be attached thereto stably without rattles.

In this electronic device 10, the attachment part 32 of the expansion unit 14 has the positioning protrusions 34 to be inserted into the positioning holes 19 disposed at the attached part 16 of the tablet PC 12. Thereby when the expansion unit 14 is attached to the tablet PC 12, the positioning protrusions 34 are fitted and inserted into the positioning hole 19. As a result, the expansion unit 14 and the tablet PC 12 can be attached more stably, and the bending strength of them when they are rotated mutually around the lateral faces 12a, 24a attached to each other as the rotary axis also is improved.

In this electronic device 10, the attachment part 32 includes the coil spring 48 to bias the hooks 36 in the engagement cancellation direction against the base member 40, and the coil spring 52 to bias the base member 40 in the opposite direction from the pulling direction against the chassis 24 of the expansion unit 14. Thereby, rattling of the hooks 36 and the base member 40 can be prevented, and the hooks 36 and the base member 40 can be pushed for smooth movement by the hook-pressing part 38a and the base pressing parts 38b of the lever 38.

In this electronic device 10, the coil springs 54 intervene between the hook 36 and the base member 40. When the base member 40 moves in the pulling direction, the attachment part 32 moves the hook 36 in the pulling direction via the coil springs 54. That is, when the opening edge 20a of the engagement hole 20 is pulled by the hook 36 using the lever 38, the coil springs 54 intervene between the base member 40 pressed by the lever 38 and the hook 36. This can ensure the close contact of the engagement claw 36a of the hook 36 with the opening edge 20a of the engagement hole 20. Further, the engagement claw 36a of the hook 36 elastically biases the opening edge 20a of the engagement hole 20 in the pulling direction by the coil springs 54, and therefore the hook 36 and the engagement hole 20 can be engaged firmly without rattles.

The electronic device 10 according to the present embodiment includes the tablet PC 12 that is portable information equipment with the attached part 16 disposed at the lateral face 12*a*, and the cover member 60 including the attached part 62 to be attached detachably to the attachment part 16 and to cover the lateral face 12*a* of the tablet PC 12. The attachment part 62 includes the hooks 64 and the locking pin 66. Each of the hooks 64 includes the engagement claw 64*a* that is inserted into the engagement hole 19, 20 disposed at the attachment part 16 of the tablet PC 12 at the non-engagement position and moves from the non-engagement position to the engagement position so as to be latched with the opening edge 20*a* of the engagement hole 19, 20, and the engagement claw 64*a* has the inclined face 64*b* that is inclined toward the tablet PC 12 in the engagement direction with the opening edge 20*a*. The locking pin 66 is configured to be inserted into the locking hole 70 of the attached part 16 when the hooks 64 engage with the engagement holes 19, 20 so as to regulate the movement of the hooks 64 in the opposite direction from the engagement direction.

Therefore, when the cover member 60 is attached to the tablet PC 12 to cover the lateral face 12*a*, the hooks 64 of the cover member 60 are inserted into the engagement holes 19, 20 of the tablet PC 12, and then the cover member 60 is slid in the engagement direction. Thereby, the inclined face 64*b* at the engagement claw 64*a* of each hook 64 slides along the opening edge 20*a* of the corresponding engagement hole 19, 20. As a result, the hook 64 moves in the engagement direction while moving toward the tablet PC 12, whereby the cover member 60 itself also moves in the engagement direction while moving close to the tablet PC 12, and so the cover member 60 can be attached to the tablet PC 12 closely and reliably. In this way, the hooks 64 can engage with the engagement holes 19, 20 stably and firstly by the simple configuration of the inclined face 64*b* of the hook 64. Further, when the hooks 64 engage with the engagement holes 19, 20, the locking pin 66 is inserted into the locking hole 70 of the tablet PC 12. As a result, movement of the hooks 64 in the engagement cancellation direction from the engagement holes 19, 20 can be regulated by the regulating action of the locking pin 66 inserted into the locking hole 70, and therefore the attachment of the cover member 60 to the tablet PC 12 can be more stable, and falling of the cover member 60 can be prevented.

In this electronic device 10, the hooks 64 are fixed to the chassis of the cover member 60, and the locking pin 66 is elastically supported so as to protrude from the chassis of the cover member 60 retractably along the direction in which the attachment part 62 faces the attached part 16. Thereby, the hooks 64 can engage with the engagement holes 19, 20 by sliding the cover member 60. The locking pin 66 is configured to be embedded when it comes into contact with the lateral face 12*a* of the tablet PC 12 at a position other than the locking hole 70, and to protrude when it is at the position of the locking hole 70. This configuration enables the smooth attachment operation.

In this electronic device 10, the cover member 60 includes the lock cancellation member 68 to cancel the locking of the locking pin 66 in the locking hole 70. The manipulation direction of the lock cancellation member 68 to cancel the locking of the locking pin 66 and the moving direction of the cover member 60 to cancel the engagement of the hooks 64 with the engagement holes 19, 20 are the same direction (to the left in FIG. 19). Thereby, following the locking cancellation operation for the locking pin 66 by the lock cancellation member 68, the cover member 60 can be moved smoothly in the engagement cancellation direction to cancel the engagement of the hooks 64 with the engagement holes 19, 20. This can improve the operability when the cover member 60 is detached from the tablet PC 12.

As has been described, the present invention provides an electronic device having a portable information equipment and an expansion unit configured to be attached to the portable information equipment.

The embodiment as stated above illustrates the configuration in which the attachment part 32 of the expansion unit 14 includes two hooks 36 and the attachment part 62 of the cover member 60 includes six hooks 64. The number of the hooks 36, 64 can be changed as needed. Note here that, since the cover member 60 has a rod shape with a small diameter as compared with the expansion unit 14, and so the cover member 60 is inferior to the expansion unit 14 in rigidity against bending deformation. Therefore, the number of the hooks 64 of the attachment part 62 is preferably more than the number of the hooks 36 of the attachment part 32.

The embodiment as stated above illustrates the hooks 64 having the inclined face 64*b* and the locking pin 66 making up the attachment part 62 of the cover member 60. Such an attachment part 62 may be disposed instead of the attachment part 32 of the expansion unit 14.

While the invention has been particularly shown and described with reference to a preferred embodiment, it will be understood by those skilled in the art that various changes in form and detail may be made therein without departing from the spirit and scope of the invention.

What is claimed is:

1. An electronic device comprising:
   a portable information equipment having an attached part at one lateral face thereof; and
   an expansion unit having an attachment part to be removably attached to said attached part, wherein said expansion unit is configured to expand a function of said portable information equipment, wherein said expansion unit is attachable to said portable information equipment by attaching said attachment part to said attached part, wherein said attachment part includes
   a hook configured to be movable in an engagement direction from a non-engagement position to an engagement position, in the non-engagement position, wherein said hook is inserted into an engagement hole disposed at said attached part of said portable information equipment, in said engagement position, wherein said hook engaging with said engagement hole, said hook being configured to be further movable in a pulling direction of pulling said portable information equipment towards said expansion unit, said pulling direction being orthogonal to said engagement direction; and
   a manipulation member to move said hook in said engagement direction and in said pulling direction.

2. The electronic device of claim 1, wherein said attachment part includes a positioning protrusion to be inserted into a positioning hole disposed at said attached part of said portable information equipment.

3. The electronic device of claim 1, wherein said attachment part includes a base member configured to support said hook to be movable in said engagement direction and in an engagement cancellation direction that is the opposite direction of said engagement direction.

4. The electronic device of claim 3, wherein said manipulation member includes
   a hook-pressing part configured to press a hook cam face of said hook so as to move said hook in said engagement direction; and a base pressing part configured to press a base cam face of said base member so as to move said base member in said pulling direction.

5. The electronic device of claim 3, wherein said attachment part includes:
   a first elastic member configured to bias said hook against said base member in said engagement cancellation direction; and
   a second elastic member configured to bias said base member against a chassis of said expansion unit in the direction opposite of said pulling direction.

6. The electronic device of claim 5, wherein a third elastic member intervenes between said hook and said base member, and when said base member moves in said pulling direction, said attachment part moves said hook in said pulling direction via said third elastic member.

7. The electronic device of claim 1, wherein said manipulation member includes a lever member configured to be rotatable from an attachment position to an attachment cancellation position, in the attachment position, said manipulation member lying over an outer face of said chassis of said expansion unit, in said attachment cancellation position, said lever member standing from said outer face.

8. The electronic device of claim 1, wherein said portable information equipment is a tablet personal computer including a display enabling a touch operation.

\* \* \* \* \*